Patented Dec. 22, 1931

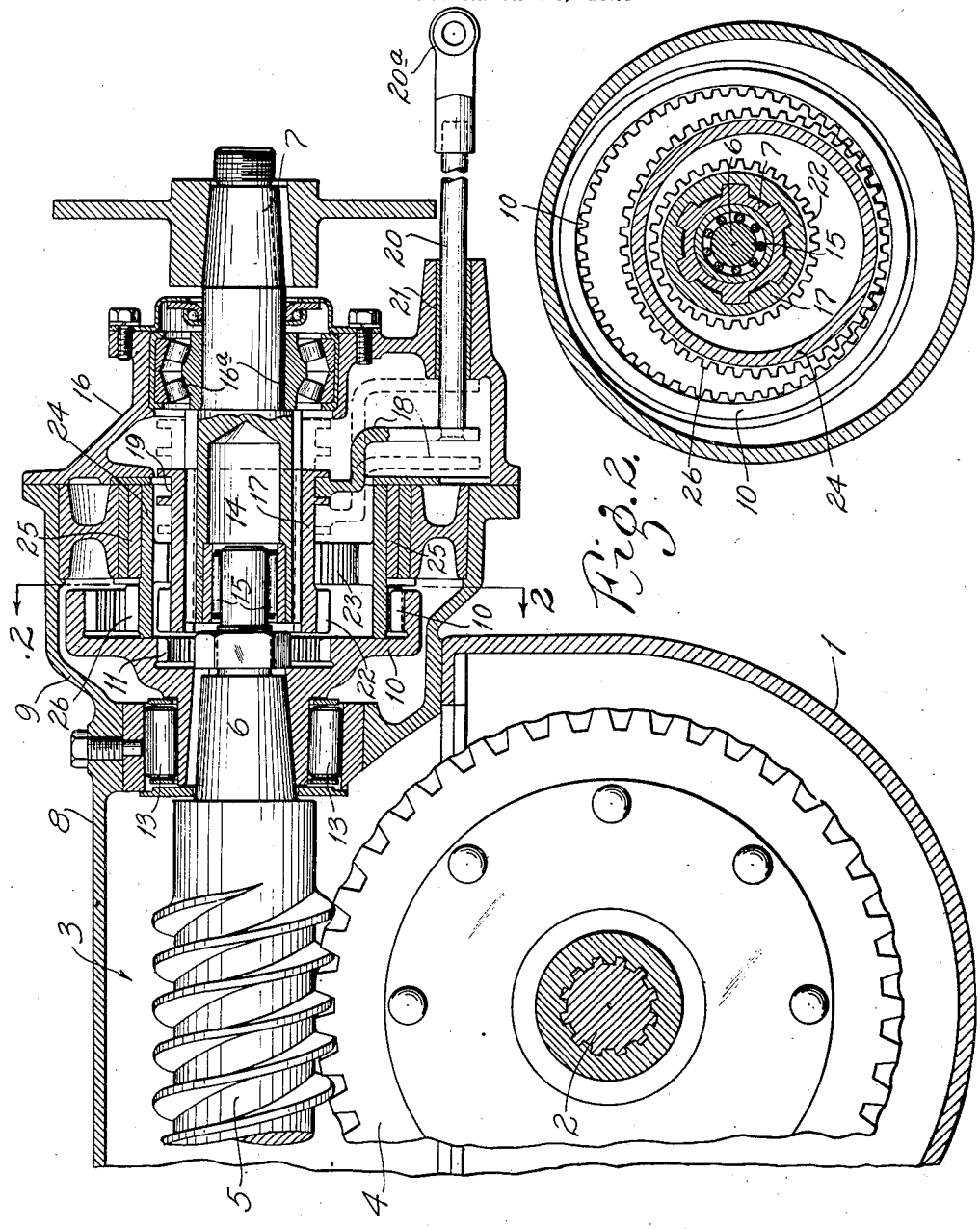

1,837,883

UNITED STATES PATENT OFFICE

MATHEW B. MORGAN, OF DETROIT, MICHIGAN, ASSIGNOR TO THE TIMKEN-DETROIT AXLE COMPANY, OF DETROIT, MICHIGAN, A CORPORATION OF OHIO

CHANGE SPEED DRIVING AXLE

Application filed March 25, 1929. Serial No. 349,596.

This invention relates to change speed automobile driving axles adapted to provide speed changing means in addition to the usual variable speed transmission gearing of the vehicle. The invention has for its principal objects to produce a change speed driving axle of simple and efficient construction which can be quickly and easily operated and which will be of strong, durable and compact design. The invention consists in the change speed driving axle and in the parts and in the construction, combinations and arrangements of parts hereinafter described and claimed.

In the accompanying drawings, which forms part of this specification and wherein like symbols refer to like parts wherever they occur, Fig. 1 is a vertical transverse cross-section through the middle portion of a differential driving axle equipped with change speed gearing embodying my invention; and Fig. 2 is a vertical cross-section on the line 2—2 in Fig. 1.

Referring to the accompanying drawings, my invention is shown in connection with an automobile driving axle comprising a tubular axle casing or housing 1 having axially alined driving shaft sections 2 therein, with a suitable differential mechanism 3 for driving said axle sections. Mounted on the differential mechanism 3 and forming a part thereof is a worm gear ring 4 which meshes with a worm 5 on the inner section of a pair of axially alined inner and outer propeller shaft sections 6 and 7, respectively. In the construction illustrated, the differential mechanism 3 and the propeller shaft sections are mounted in a differential carrier 8 of common type and are movable therewith as a unit. In the construction shown, the propeller shaft sections 6 and 7 are located above the worm gear 4 of the differential 3 and are rotatably supported in a forwardly projecting tubular nose portion 9 of the differential gear carrier 8.

Fixed to the outer end portion of the inner propeller shaft section 6 is the hub of an internal gear 10 that is provided with an internal clutch member 11. The hub portion of said internal gear is rotatably supported in a suitable roller bearing 13 provided therefor in the hollow portion 9 of the carrier 8. The internal clutch member and gear teeth of the internal gear are disposed concentric to each other and to the axis of the propeller shaft and are spaced apart longitudinally of said shaft. The inner end of the outer propeller shaft section 7 is provided with an axial recess 14 within which is mounted a suitable roller bearing 15; and the adjacent outer end of the inner propeller shaft section 6 extends into said bearing and thus serves to rotatably support the inner end of said outer propeller shaft section. The outer end portion of the outer propeller shaft section 7 is journaled in a suitable roller bearing 16a mounted in a closure cap 16 secured to the outer end of the tubular nose portion 9 of the differential gear carrier 8.

Splined on the inner end portion of the outer propeller shaft section 7 is a clutch sleeve 17 which is adapted to be moved longitudinally of said shaft by the usual clutch fork 18 which cooperates with an annular groove 19 provided therefor in the outer end of said clutch sleeve. The clutch fork 18 is fixed to a shifter rod 20 disposed parallel to the propeller shaft and mounted for longitudinal sliding movement in a bearing 21 provided therefor in the cover plate 16 for the outer end of the tubular nose portion 9 of the differential gear carrier 8. The outer end of the clutch shifter rod 20 is provided with a suitable fitting 20a adapted to be connected with a suitable actuating device (not shown). The inner end of the slidable clutch sleeve 17 is provided with a combined external gear and clutch member 22 of a proper size to interlock with the internal clutch member 11 of the internal gear wheel 10 fixed to the inner propeller shaft section 6. The combined external gear and clutch member 22 of the clutch sleeve 17 is also adapted to be intermeshed with a larger internal gear 23 formed on the interior surface of a sleeve 24 which surrounds said clutch sleeve and is eccentrically mounted in a plain bearing 25 provided therefor in the tubular nose portion 9 of the differential gear carrier 8. If desired, the eccentric sleeve 24 may be rotatably supported in antifriction bearings, such as ball or roller bearings, instead of the plain bearing 25. The inner end of the eccentric sleeve 24 projects inwardly beyond the bearing 25 provided therefor in the tubular nose portion 9 of the axle housing 8 where it is provided with an external gear 26 in position to intermesh continuously with the large internal gear wheel 10 fixed to the outer end of the inner propeller shaft section 6.

By the arrangement described, when the slidable clutch sleeve 17 is in neutral position, with the combined external gear and clutch member 22 thereof disengaged from the internal gear 23 of the eccentric sleeve 24 and the internal clutch member 11 of the internal gear 10, no motion is imparted to the inner propeller shaft section 6. When the clutch sleeve 17 is slid inwardly to cause the combined external gear and clutch member 22 thereon to interlock with the internal clutch member 11 of the internal gear 10, the two propeller shaft sections 6 and 7 are thus directly geared or clutched together, thereby securing a direct drive between the two sections. When the clutch sleeve 17 is shifted outwardly to bring the combined external gear and clutch member 22 thereon into mesh with the internal gear 23 of the eccentric sleeve 24, the inner propeller shaft section is indirectly driven from the outer propeller shaft section at a reduced rate of speed, the drive being from said clutch sleeve to the eccentric sleeve and thence through the external gear 26 on said eccentric sleeve to the large internal gear 10 fixed to the adjacent outer end of the inner propeller shaft section 6.

The construction hereinbefore described is simple, economical and easy to manufacture and assemble. It is strong and durable, it contains a minimum number of parts and is compactly housed within the differential gear carrier and can be removed therewith as a unit. It is evident that numerous changes may be made without departing from the invention; therefore, I do not wish to be limited to the precise construction shown and described.

What I claim is:

1. A change speed differential driving axle comprising an axle housing, differential gearing, a carrier for said differential gearing, axially alined inner and outer propeller shaft sections mounted in said carrier for driving said differential gearing, an internal gear having a hub fixed to the inner propeller shaft section for rotation therewith, said internal gear being provided with an internal clutch member, an antifriction bearing interposed between said carrier and the hub of said internal gear, a clutch sleeve splined on the outer propeller shaft section, a sleeve surrounding said clutch sleeve and journaled in said carrier eccentric to said propeller shaft sections, said eccentric sleeve having an internal gear and an external gear, said external gear being in continuous mesh with said first mentioned internal gear, said clutch sleeve having a combined external gear and clutch member adapted to be clutched with the internal clutch member of said first mentioned internal gear or to be intermeshed with the internal gear on said eccentric sleeve, said carrier having an opening in one end thereof through which said shaft sections, gears, bearings and clutch sleeve are adapted to be inserted in and removed from said housing, a cap for closing said opening, antifriction bearings supported in said cap and rotatably supporting said outer shaft section, and a rod mounted in said cap for shifting said clutch sleeve.

2. A change speed axle comprising a housing, differential gearing, a carrier for the differential gearing removably secured to said housing and provided with a housing, propeller shaft sections journaled in the carrier housing in axial alinement, the inner shaft section being operatively connected with said differential gearing, an internal gear having a hub fixed to the inner shaft section and provided with internal clutch teeth, an antifriction bearing interposed between the carrier housing and the hub of said internal gear, a clutch sleeve splined on the outer shaft section, a shifter rod for said clutch sleeve, and a sleeve surrounding said clutch sleeve and journaled in said carrier housing eccentric to said shafts, the eccentric sleeve having an internal gear and an external gear, said external gear being in continuous mesh with the internal gear fixed to the inner shaft section, said clutch sleeve having an external gear thereon adapted to fit the internal clutch teeth on the internal gear fixed to said inner shaft section or intermesh with the internal gear on the eccentric sleeve, said differential gear carrier housing having an opening therein through which said shafts, said internal gear, said antifriction bearings, said clutch sleeve, said eccentric sleeve and said shifter rod are adapted to be inserted in and removed from said gear carrier housing, and a cap for said opening, said cap being provided with an opening in which one of said shafts is rotatably supported and an opening in which said shifter rod is slidably supported.

3. A change speed differential driving axle comprising a housing, differential gearing, a carrier for said differential gearing, axially alined inner and outer propeller shaft sections journaled in said carrier for driving said differential gearing, an internal gear fixed to the inner propeller shaft section, an antifriction bearing mounted in said carrier for rotatably supporting said internal gear therein, a sleeve journaled in said carrier in eccentric relation to said propeller shaft sections and having an internal gear and an external gear, said external gear being in continuous mesh with the internal gear fixed to the inner propeller shaft section, an external gear mounted on the outer propeller shaft section for rotation therewith and adapted to intermesh with the internal gear of the eccentric sleeve, said carrier having an opening therein through which said propeller shaft section, said sleeve, said external gear, and said antifriction bearings are adapted to be inserted in and removed from said carrier, and a cap for said opening, said cap being provided with an opening in which the outer propeller shaft is rotatably supported.

4. An automobile driving axle comprising a housing, differential gearing, a carrier therefor removably secured to said housing, said carrier being provided with a tubular nose portion, propeller shaft sections in said nose portion in axial alinement, the inner shaft section being operatively connected with said differential gearing, an internal gear fixed to said inner shaft section, antifriction bearings mounted in said housing for rotatably supporting said internal gear, a sleeve journaled in said nosing in eccentric relation to said shaft sections and having an internal gear and an external gear, said external gear being in continuous mesh with the internal gear fixed to the inner shaft section, and an external gear fixed to said outer shaft section for rotation therewith and adapted to intermesh with the internal gear of the eccentric sleeve.

5. A change speed driving axle comprising a housing, differential gearing, a carrier secured to said housing and supporting said differential gearing, said carrier being provided with a tubular nose portion having an opening in the outer end thereof, propeller shaft sections journaled in the nose portion of said carrier in axial alinement, the inner shaft section being operatively connected with said differential gearing, an internal gear having a hub portion fixed to said inner shaft section and provided with internal clutch teeth, antifriction bearings interposed between said nosing and the hub of said internal gear, a sleeve journaled in said nosing in eccentric relation to said shaft sections and having an internal gear and an external gear, said external gear being in continuous mesh with the internal gear fixed to said inner shaft section, a gear splined on said outer shaft section and adapted to be clutched with the internal clutch teeth of the internal gear fixed to said inner shaft section or to be intermeshed with the internal gear of the eccentric sleeve, a cap for closing the opening in the outer end of said nosing, and antifriction bearings mounted in said cap for supporting the outer end of said outer shaft section, and a rod mounted in said cap for shifting the gear splined on said outer shaft.

Signed at Detroit, Michigan, this 20th day of March, 1929.

MATHEW B. MORGAN.